June 2, 1953 — L. STASCHOVER ET AL — 2,640,939
PHASE DETECTOR
Filed Feb. 11, 1950 — 3 Sheets-Sheet 1

INVENTORS
LEO STASCHOVER
LAWRENCE ROSENBERG
BY
Percy P. Lantz
ATTORNEY

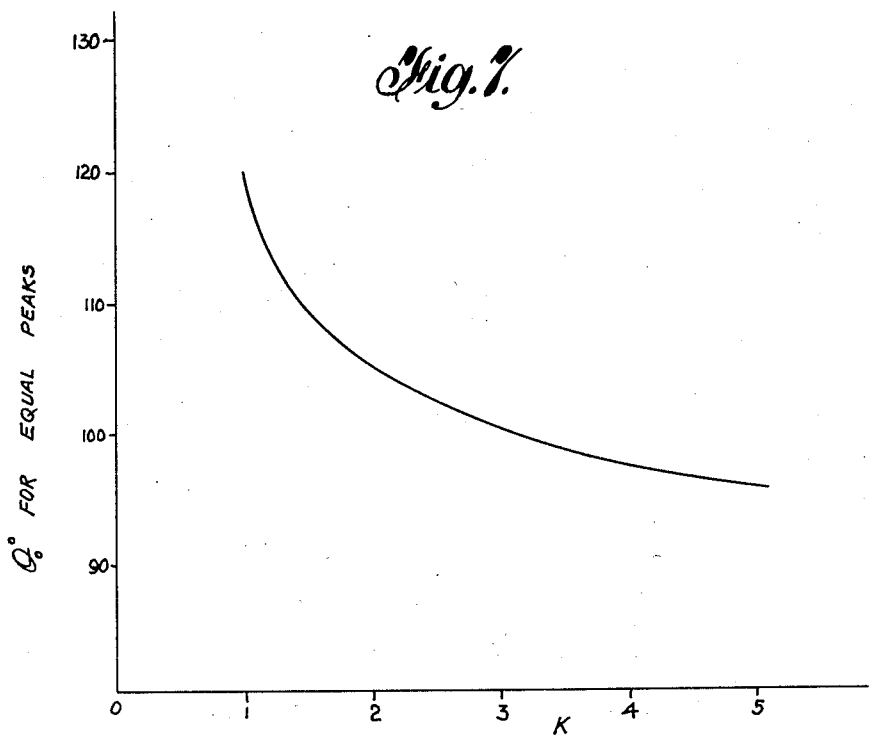
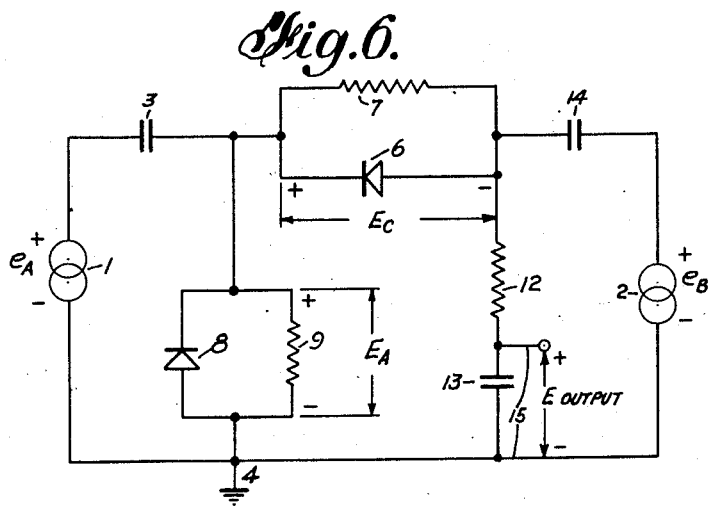

Patented June 2, 1953

2,640,939

UNITED STATES PATENT OFFICE 2,640,939

PHASE DETECTOR

Leo Staschover, Jamaica, and Lawrence Rosenberg, Elmhurst, N. Y., assignors to International Standard Electric Corporation, New York, N. Y.

Application February 11, 1950, Serial No. 143,739

12 Claims. (Cl. 307—77)

This invention relates to phase detectors and more particularly to phase detectors suitable for use without transformers whereby they are particularly useful for very high frequency work.

Numerous types of phase detectors for indicating departure from a predetermined phase relationship between two alternating current energies have been proposed. In most of these phase detectors it is desirable that the departure from a predetermined phase relationship, usually 90°, should be indicated together with an indication of the sense of departure from this predetermined phase, so that correction may be provided. Such proposed systems generally require that balanced voltages be used necessitating in general the use of transformers for applying the alternating energy to the circuit. For very high frequency operation it is difficult to obtain properly balanced voltages from a transformer as any structural imperfections in such transformers will tend to cause unbalance.

It is an object of this invention to provide a phase detector particularly useful in very high and ultra high frequency ranges which system does not require balanced energies to be supplied thereto.

In accordance with this invention the phase detector may comprise a circuit for deriving a direct current voltage equivalent to the vector sum of the voltages from the sources to be compared, this vector sum varying in magnitude between given limits dependent upon the phase angle of the applied voltages. A circuit is provided for deriving from one or both of the sources a direct current voltage of a magnitude intermediate between the limits of magnitude of the vector sum of these voltages. The two derived voltages are combined in phase opposition, so that variations in magnitude of the vector representing the sum of the voltages above and below the second derived voltage will produce output voltages of different polarity having amplitude dependent upon the degree of departure from equality between these two derived voltages.

For the purpose of control of the phase relationship it is desirable that any changes in supply voltages from the sources being compared should have negligible effect on the condition for the zero output of the phase detector. For this purpose it is preferable that the phase angle represented by the direct current voltage opposed to the vector sum voltage be equivalent to a 90° phase angle between the energies being compared. While it is not essential that the departure in phase from this reference point provide equal magnitude variations it may be advantageous in some cases to have these variations symmetrical. It is also desirable that the system be suitably operative regardless of whether the voltages supplied to the circuit for comparison are balanced or unbalanced sources.

In accordance with a feature of this invention the rectifier resistance combination is provided coupled to one terminal of each of two wave sources, the other terminals of these wave sources being effectively connected to ground at the alternating current. This circuit will provide a direct current voltage substantially equivalent to the departure in phase between the voltages from the two sources. Across one or both of these sources is provided another rectifier resistance combination for deriving voltages dependent upon the amplitude of the input signal. These rectifier resistance combinations are so coupled that the voltages produced in those bridged across the respective energy sources will oppose the one which is commonly coupled to both sources. This opposed or bucking voltage is preferably adjusted in magnitude to correspond to the summation factor magnitude represented by a 90° phase relationship of the two input energies.

The above mentioned and other features and objects of this invention and the manner of attaining them will become more apparent and the invention itself will be best understood by reference to the following description of an embodiment of the invention taken in conjunction with the accompanying drawings, in which:

Fig. 6 is a diagram of a simplified phase detector circuit incorporating the features of this invention, and Fig. 7 is a curve illustrating certain characteristic operative features of this invention.

Figure 1:
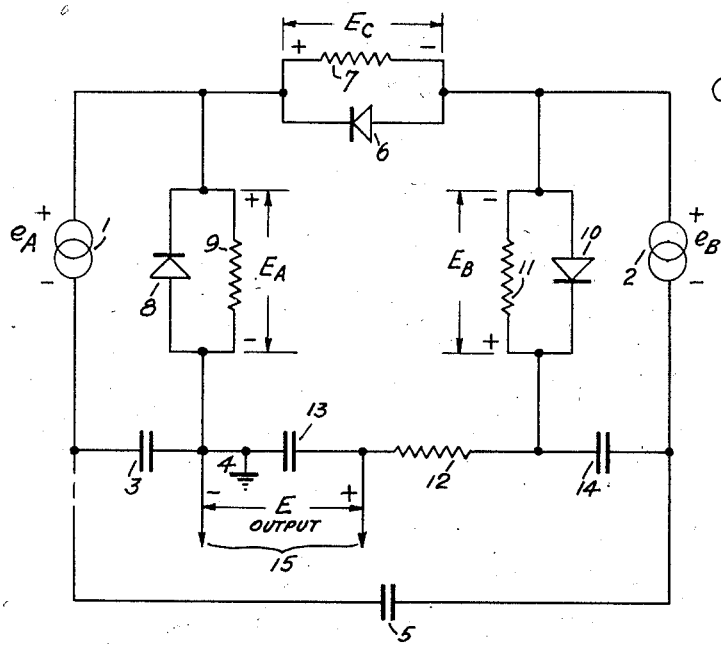
Fig. 1 is a schematic circuit diagram of a phase detector circuit in accordance with this invention illustrating the basic circuit thereof.

Turning now to Fig. 1, there is shown a phase detector circuit for detecting a phase relationship between energies from a source 1 and a source 2. Source 1 may for example be a standard comparison wave from a highly stabilized oscillator while source 2 may comprise the output from a circuit to be regulated. Source 1 is coupled through a coupling condenser 3 to ground at point 4 and source 2 may be coupled effectively to ground at the alternating current value through the medium of coupling condenser 5 and condenser 3. The other terminals of sources 1 and 2 are coupled at opposite sides of a network consisting of a rectifier 6 and resistor 7 in parallel. Thus in this network there will be provided a summation rectified voltage $E_c$ which is equal to the rectified vector sum $e_c$ of $e_A$ the alternating voltage from source 1 and $e_B$, the alternating voltage from source 2 (Fig. 2), and therefore is a function of their phase difference $\theta$. Across source 1 is coupled a network comprising a rectifier 8 and a resistor 9 in parallel producing a direct current voltage, $E_A$, and across rectifier source 2 is provided a network comprising a rectifier 10 and resistor 11, providing a direct current voltage, $E_B$, from source 2. Voltages $E_A$ and $E_B$ are effectively in series aiding connection across a decoupling resistor 12 and a smoothing condenser 13. Condenser 14 serves to provide coupling of network 10, 11 to source 2, in the same manner as condenser 3 couples source 1 to network 8, 9. Network 6, 7 is arranged so that its polarity is opposed to the polarity of the output voltages from networks 8, 9 and 10, 11. It will then be seen that the output voltage in output lines 15 across condenser 13 is equal to $$E_A + E_B - E_C$$

Voltages $E_A$ and $E_B$ are independent of the angle $\theta$ but are proportional in amplitude to the peak amplitude output of sources 1 and 2 respectively. Resistor 12 and condenser 13 serve as a low pass filter to eliminate the alternating current component. The shape of the output characteristic of the phase detector at output lines 15 is therefore determined by the voltage $E_c$.

In order to analyse the operation of the system we may assume that the voltage output from source 1 is greater than or equal to the output from source 2 and, define a constant $K$ as being equivalent to the output from source 1 divided by the output from source 2 or $$K \equiv \frac{e_A}{e_B} \quad (1)$$

Figure 2:
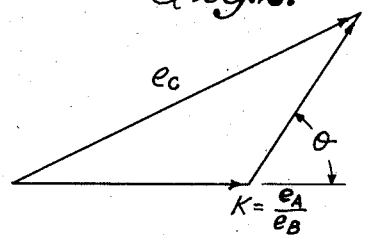
Fig. 2 is a vector diagram used in explaining the operation of the circuit in Fig. 1.

If we assume that $e_B$, the output from source 2 is 1 volt for convenience and define rectifier efficiencies of the three rectifier circuits 8, 9; 10, 11; and 6, 7 as $g_A$, $g_B$, $g_C$ the vector diagram of Fig. 2 is obtained. Thus:

$$e_C = [(K + \cos\theta)^2 + \sin^2\theta]^{\frac{1}{2}} = \frac{E_c}{g_c} \quad (2)$$

which reduces to:

$$= 2K\left[\left(\frac{K^2+1}{2K} + \cos\theta\right)\right]^{\frac{1}{2}} \quad (3)$$

This may be arranged as follows:

$$\frac{E_c}{g_c\sqrt{2K}} = \left[\frac{K^2+1}{2K} + \cos\theta\right]^{\frac{1}{2}} \quad (4)$$

Figure 3:
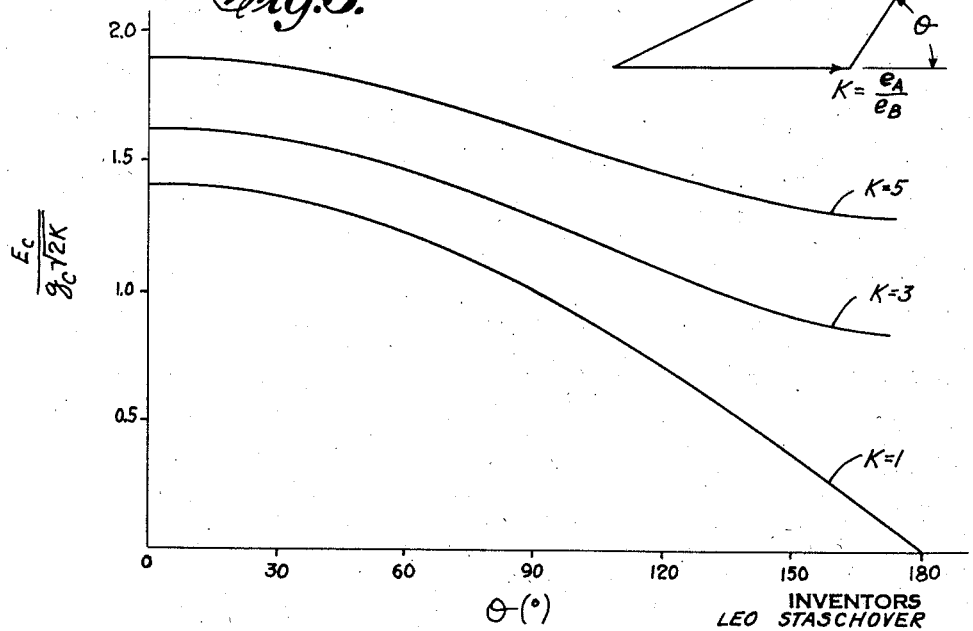
Fig. 3 is a set of curves illustrating the characteristic output of the circuit of Fig. 1.

Using this last equation and plotting the function $$\frac{E_c}{g_c\sqrt{2K}} \text{ vs. } \theta$$

the shape characteristics of the detector circuit 6, 7 is obtained as shown in Fig. 3 for three different values of K. It will be noted that the symmetrical characteristic of the known types of simple push-pull phase detector is approached for larger values of K. For example, when K is equal to 5 as shown in the uppermost curve substantial symmetry is obtained about the 90° phase angle.

Figure 4:
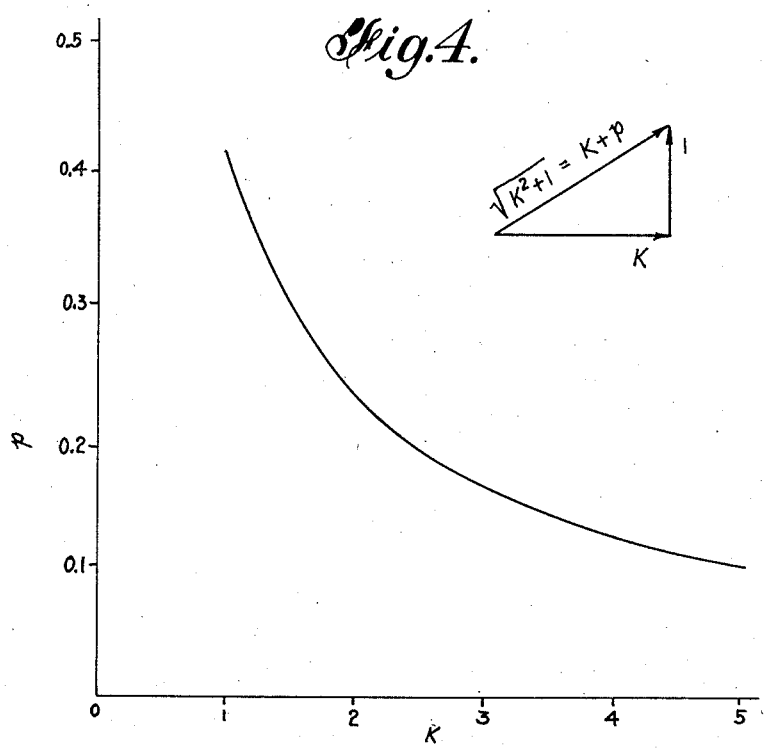
Fig. 4 is a curve expressing relationship between certain of the constants of the phase detector circuit desirable for predetermined operation thereof.

It will be noted, however, that in this case the value of the function is measured from zero so that departures from this zero position are all in the same sense or direction. Accordingly, the bucking voltage or bias must be provided so that a zero output will be had at some point $\theta = \theta_0$. A desirable value for $\theta_0 = 90°$. At $\theta = 90°$ $$\left.\frac{E_c}{g_c}\right|_{\theta=90°} = \sqrt{k^2+1} \equiv K+p \quad (5)$$

where $p$ is a function of $K$ as plotted in Fig. 4. To obtain zero output at the point where $\theta$ equals 90° the following conditions must exist $$E_c\big|_{\theta=90°} = E_A + E_B \quad (6)$$

$$= g_A K + g_B \quad (7)$$

$$= g_c(K+p) \quad (8)$$

substituting the values $g_A K + g_B$ for $E_c$ in the Equation 5 and solving for $K+p$ we obtain $$K + p = \frac{g_A}{g_c} K + \frac{g_B}{g_c} \quad (9)$$

To satisfy this relation for all values of $K$ the following conditions must be obtained $$g_A = g_c \quad (10)$$

$$\frac{g_B}{g_c} = p \quad (11)$$

Condition 10 is obtained and will be readily checked in practice by letting the output voltage $E_B$ equal zero and making $E_A$ equal to $E_c$. The Condition 11 may be satisfied by tapping off a part of the resistor 11.

Figure 5:
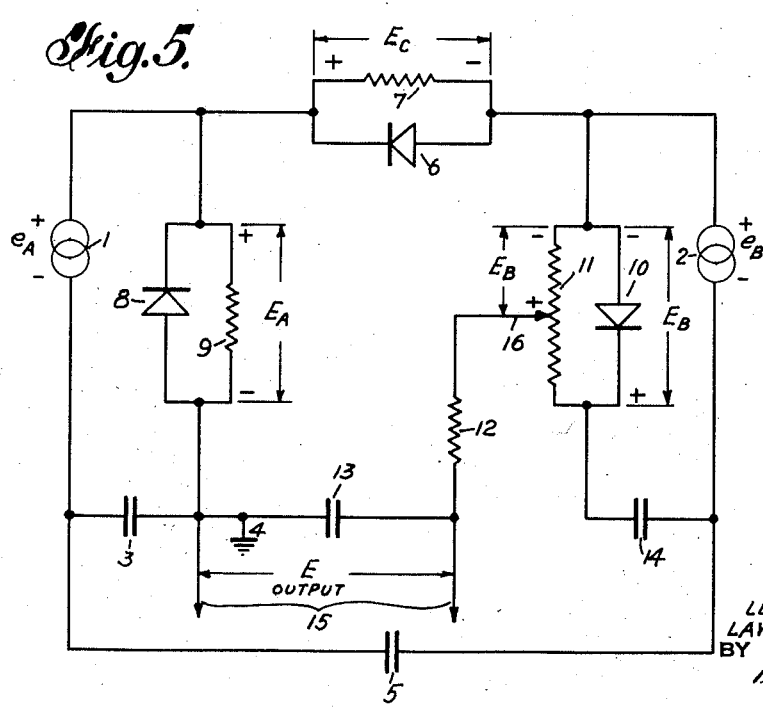
Fig. 5 is a circuit diagram of a modified form of phase detector in accordance with this invention embodying the principles represented by the curve of Fig. 4.

Fig. 5 shows a circuit arrangement wherein this provision is made. The same reference characters being as those applied in Fig. 1 to the equivalent elements therein. In accordance with this arrangement a variable tap 16 is provided along resistor 11. In order to obtain the desired relations set forth in Equations 10 and 11 the relative amplitude of output circuit A and B may be measured and the constant K determined. Having determined this constant the value $p$ may be obtained from the curve of Fig. 4 and tap point 16 adjusted in accordance with this value. As is evident from the curve of Fig. 4 the adjustment of $$\frac{g_B}{g_C}$$

can be made only for a single value of K. For example, if $K=3$ so that $p=.165$, as K changes between 2 and 3 the output voltage at the 90° phase difference will vary from .235–.165 or 7% and as K changes between 3 and 4 the output voltage will vary between .165 and .120=4.5% of the amplitude of $E_B$, which may not be excessive for many applications. It will be noted, however, that the phase characteristic for this arrangement is not symmetrical about the 90° point. In fact when K is equal to 1 the variation in the peaks may amount to 2.5 to 1. In a phase-lock system where phase must be maintained quite accurately it may be preferable to have equal positive and negative peaks rather than preserving the particular phase relationship of $\theta_0 = 90°$. Since $$E_C\max. = g_c(K+1)$$

and $$E_C\min. = g_c(K-1)$$

the bucking voltage necessary for equal peaks is equal to $$\tfrac{1}{2}(E_C\max. + E_C\min.) \text{ or } g_c K \quad (12)$$

Since the voltage $$E_A = g_A K$$

the bucking voltage may be provided solely by the source 1 if $g_A$ is made equal to $g_C$. The detector then consists of only two rectifier circuits as illustrated in Fig. 6. In this variation condenser 5 is no longer necessary, condensers 3 and 14 serving to provide the summation of $E_A$ and $E_B$. The one terminal of sources 1 and 2 may then be connected directly to ground 4, and the smoothing condenser 13 and decoupling resistor 12 appear connected directly between a terminal of network 6, 7 and ground 4. In Fig. 7 is plotted the relationship between $\theta_0$ and K for the circuit arrangement of Fig. 6. It will be noted that the variation in $\theta_0$ i. e. the variation of $\theta$ at which the output voltage equals zero with the ratio K, is seen to approach the 90° relationship as K increases.

In the analysis of the various circuits the internal impedance of the voltage sources has been assumed negligible compared with the input impedance of the various rectifier circuits so that no interaction between the sources will exist. This assumption is quite valid for the operation at frequencies up to several hundred kilocycles but is not quite valid at the higher frequencies in the megacycle ranges and higher. In these cases the above analysis becomes increasingly qualitative, but the general principles of the system are applicable at these higher ranges.

It will be understood that while the rectifier circuits illustrated herein are of the shunt type in which the rectifier and load resistance are connected in parallel, a rectifier connected in series with the load resistance shunted by a capacitor may be substituted for the shunt type wherever desirable.

While we have described above the principles of our invention in connection with specific apparatus, it is to be clearly understood that this description is made only by way of example and not as a limitation to the scope of our invention.

We claim:

1. A phase detector for providing a voltage varying with the phase angle between voltages from two alternating current energy sources, comprising first means for deriving a direct current voltage equivalent to the vector sum of the voltages from said sources variable in magnitude between limits dependent upon the relative phase angle of said voltages, second means for deriving from at least one of said sources a direct current voltage of a magnitude intermediate between said limits, and means for combining said direct current voltages in opposition to provide a resultant direct current voltage varying in polarity and amplitude dependent upon departure in magnitude of said first named voltage from the magnitude of said second named voltage.

2. A phase detector according to claim 1, where said sources each have two output terminals, one of the terminals of each of said sources being effectively coupled to ground at the operating alternating current frequency, the other terminals of said sources being coupled to said first means.

3. A phase detector according to claim 1, wherein said first means comprises a rectifier and a resistor connected in parallel to provide a first network, said sources being coupled to opposite ends of said network.

4. A phase detector according to claim 1, further comprising a smoothing filter for eliminating the alternating current component from said resultant direct current voltage.

5. A phase detector for providing a voltage varying with the phase angle between voltages from two alternating current energy sources, comprising first means for deriving a direct current voltage equivalent to the vector sum of energy from said sources variable in magnitude between limits dependent upon the relative phase angle between said voltages, second means for deriving from each of said sources a direct current voltage the sum of which has a magnitude intermediate between said limits, and means for combining said first named direct current voltages in opposition to the sum of said other voltage to provide a resultant direct current voltage varying in polarity and amplitude dependent upon departure in magnitude of said first named voltage from the magnitude of said second named voltage.

6. A phase detector according to claim 5, where said sources each have two output terminals, one of the terminals of each of said sources being effectively coupled to ground at the operating alternating current frequency, the other terminals of said sources being coupled to said first means.

7. A phase detector for providing a voltage varying with the phase angle between voltage from two alternating current energy sources, comprising a first means for deriving a direct current voltage equivalent to the vector sum of voltages from said sources variable in magnitude between limits dependent upon the relative phase angle of said energies, a second means for deriving from one of said sources only a direct current voltage of a magnitude intermediate between said limit, and means for combining said direct current voltages in opposition to provide a resultant direct current voltage varying in polarity and amplitude dependent upon departure in magnitude of said first named voltage from the magnitude of said second named voltage.

8. A phase detector according to claim 7, where said sources each have two output terminals, one of the terminals of each of the sources being effectively coupled to ground at the operating alternating current frequency, the other terminals of said sources being coupled to said first means.

9. A phase detector for providing a voltage, varying with the phase angle between voltages from two alternating current energy sources each source having two output terminals, comprising means for coupling one output terminal of each of said sources effectively at ground potential at the operating frequency, a first network comprising a parallel connected resistor and rectifier coupled between the other terminals of said sources to derive a first direct current voltage equivalent to the vector sum of said energies, a second network comprising a parallel connected resistor and condenser coupled between the terminals of one of said sources to derive a second direct current voltage equivalent to the magnitude of energy from said source, with the rectifier of said second network coupled in opposition to the rectifier of said first network, whereby the direct current voltages will oppose one another, a series resistor condenser network coupled between said networks to provide a direct current combination of said first and second voltage, and output terminals for said detector connected across said condenser.

10. A phase detector according to claim 9, further comprising a third network comprising a parallel connected resistor-rectifier combination coupled across the other source to derive a direct current voltage representative of the magnitude of energy from the associated source, the rectifier of said third network being positioned in series aiding relation with the rectifier of said second network, said resistor condenser combination being coupled between said second and third networks, whereby the resultant output voltage represents the difference between summation of the direct current voltages representative of said sources, and said vector sum voltage.

11. A phase detector according to claim 10, wherein said resistor condenser network is coupled to an intermediate point of the resistor of one of said first or second networks, related to the source having the lesser magnitude.

12. A phase detector for providing a voltage varying with the phase angle between voltages from two alternating current energy sources, comprising a rectifier and a resistor connected in parallel to provide a first network for deriving a direct current voltage equivalent to the vector sum of the voltages from said sources variable in magnitude between limits dependent upon the relative phase angle of said voltages, said sources being coupled to opposite ends of said network, means comprising a rectifier and a resistor connected in parallel to provide a second network for deriving from at least one of said sources a direct current voltage of a magnitude intermediate said limits, the rectifier of said second network being coupled in opposed relation to the rectifier of said first network, and means for combining said direct current voltages in opposition to provide a resultant direct current voltage varying in polarity and amplitude dependent upon departure in magnitude of said first named voltage from the magnitude of said second named voltage.

LEO STASCHOVER.
LAWRENCE ROSENBERG.

References Cited in the file of this patent

UNITED STATES PATENTS

| Number | Name | Date |
|---|---|---|
| 2,424,131 | Warnick | July 15, 1947 |
| 2,454,807 | Kennedy | Nov. 30, 1948 |
| 2,564,471 | Eaton | Aug. 14, 1951 |